(12) United States Patent
Schwetz et al.

(10) Patent No.: US 6,670,072 B2
(45) Date of Patent: Dec. 30, 2003

(54) APPARATUS FOR INSERTING BATTERY OR ACCUMULATOR PLATES INTO SLEEVES OF SEPARATOR MATERIAL

(75) Inventors: Anton Schwetz, Ebersdorf (AT);
Friedrich Ilgoutz, Ferlach (AT);
Thomas Rotbart, Birkfeld (AT);
Johann Kurzweil, St. Peter am Ottersbach (AT)

(73) Assignee: BM-Battery Machines GmbH, Ebersdorf (AT)

( * ) Notice: Subject to any disclaimer, the term of this patent is extended or adjusted under 35 U.S.C. 154(b) by 218 days.

(21) Appl. No.: 09/911,694

(22) Filed: Jul. 25, 2001

(65) Prior Publication Data

US 2002/0013999 A1 Feb. 7, 2002

(30) Foreign Application Priority Data

Jul. 25, 2000 (AT) .......................... 1307/2000

(51) Int. Cl.$^7$ ............................ H01M 2/18; B23P 19/00
(52) U.S. Cl. .......................... 429/136; 29/730
(58) Field of Search .................. 29/729, 730; 429/136, 429/131, 138

(56) References Cited

U.S. PATENT DOCUMENTS

| 3,665,575 A | * | 5/1972 | Sucher et al. ............... 29/2 |
| 4,080,727 A | | 3/1978 | Stolle et al. ............... 29/623.4 |
| 4,123,311 A | * | 10/1978 | McAlpine ................... 156/443 |
| 4,337,113 A | | 6/1982 | Searle ....................... 156/353 |

FOREIGN PATENT DOCUMENTS

| DE | 33 04 257 A1 | 8/1984 |
| IT | 01280541 | 7/1998 |

* cited by examiner

*Primary Examiner*—Patrick Ryan
*Assistant Examiner*—Thomas H. Parsons
(74) *Attorney, Agent, or Firm*—Young & Thompson (57) ABSTRACT

On the delivery side of a device in which tubular sleeves (25) for battery plates are produced from web-shaped separator material, there is a compartmented star (40) with several compartments (41). After a sleeve (25) has been inserted into the compartment (41), the compartmented star (40) is turned to move the compartment (41) with the sleeve (25) into the insertion position. In the insertion position the sleeve (25) in the compartment (41) is pushed by a stop (52) so far that its insertion-side end is pushed over the legs (56) of the spreading elements (55). Through the end of the sleeve (25) held open by the spreading elements (55) a plate is inserted until it rest against the stop (52). Then the sleeve (25) with the plate pushed into it is pulled out of the compartment (41) laterally by rollers (60) and delivered for further use.

21 Claims, 7 Drawing Sheets

APPARATUS FOR INSERTING BATTERY OR ACCUMULATOR PLATES INTO SLEEVES OF SEPARATOR MATERIAL

BACKGROUND OF THE INVENTION

1. Field of the Invention

The invention relates to a device for inserting battery plates, especially plates for industrial batteries into (tubular) sleeves of separator material.

2. Description of the Related Art

Positive and negative battery plates, also those for industrial and traction batteries, are simply called "plates" below. The term "sleeve" is defined as a section of a tube open on both ends which is made of a web-shaped separator material formed into a tube with a lengthwise seam. The term "pocket" is hereinafter defined as a "sleeve" which is closed on at least one end by a transverse seam.

Sleeves or pockets for plates can be produced for example from web-shaped separator material for example using the device known from IT-PS 01280541.

The problem especially in large plates, therefore those for industrial batteries, is to insert them into the tubular sleeves to the correct degree without damage by pushing so that the tubular sleeve, if provided, can be closed on at least one end to form a pocket. Often sleeves are left open on both ends. This applies especially to industrial and traction batteries since acid circulation is impeded by sleeves closed on at least one side, therefore pockets, and thus the output of the battery compared to a battery in which the plates stick in sleeves open on both sides is 10 to 15% less.

SUMMARY OF THE INVENTION

The object of the invention is to devise a device of the initially mentioned type with which insertion of plates into tubular sleeves to the desired degree is easily possible.

Preferred and advantageous embodiments of the device as claimed in the invention are the subject matter of the dependent claims.

The device as claimed in the invention offers the advantage that the finished tubular sleeve which is open on both ends is readied for plates in a flat position for insertion of the plate without the holding elements, which hinder the insertion of the plate, fitting into the interior of the sleeve.

In addition, the device as claimed in the invention makes it possible in one embodiment to ready the sleeve exactly in the position necessary for insertion of a plate and in one development of this embodiment to also ensure that the plate is pushed into the sleeve which has been readied for insertion to the desired degree. In this connection it is important to know that it is significant for the service life and function and also for the quality of batteries, especially industrial batteries, that the plate is pushed in the sleeve up to a stipulated depth, and the insertion depth in all sleeves should be the same.

The invention extends to a development of the device as claimed in the invention which allows an especially advantageous delivery of the sleeves of separator material with the plates inserted.

BRIEF DESCRIPTION OF THE DRAWINGS

Other details, advantages and features of the invention result from the following description of preferred embodiments in which reference is made to the drawings.

The device shown in FIGS. 1 to 5 for pushing plates for batteries (positive or negative plates), especially those for industrial batteries, hereinafter simply plates—into sleeves is located for example on the delivery side of the device located on the left in FIGS. 1 and 2 for producing tubular sleeves from separator material. In this device a tube with a seam running lengthwise is produced from the web-shaped separator material. Then sleeves with the desired length are cut from this tube.

The (continuous) tube which is produced in a device for producing a tube is (FIGS. 2a–2c) advanced by (at least) one pair 10 of conveyor rollers. Using a cutting device, sleeves with the desired length are cut from the tube. The cutting device consists for example of a pair of rollers 30, 31, there being cutting blades 32 on the roller 30. The sleeves are pushed into one of several compartments 41 of a transfer device 40 ("compartmented star") which are located in a star arrangement around a shaft 42 by another pair 20 of conveyor rollers in the flat compressed position.

The compartments 41 of the compartmented star 40 are formed by two walls 43 which are parallel to one another at a time and which on their edges adjacent to the roller pair 20 bear guide sheets 44 which are arranged in the shape of a funnel. The walls 43 which border the compartments 41 are formed in a star on a central shaft 42 which is pivotally mounted in the machine frame 11. Here the width of the walls 43 and thus the radial depth of the compartments 41 are chosen such that the sleeves 25 (therefore the section of tube) are not held entirely between the walls 43 which border the compartment 41, but project radially to the outside over the compartment 41 (see FIG. 4 and FIG. 5).

Figure 5:
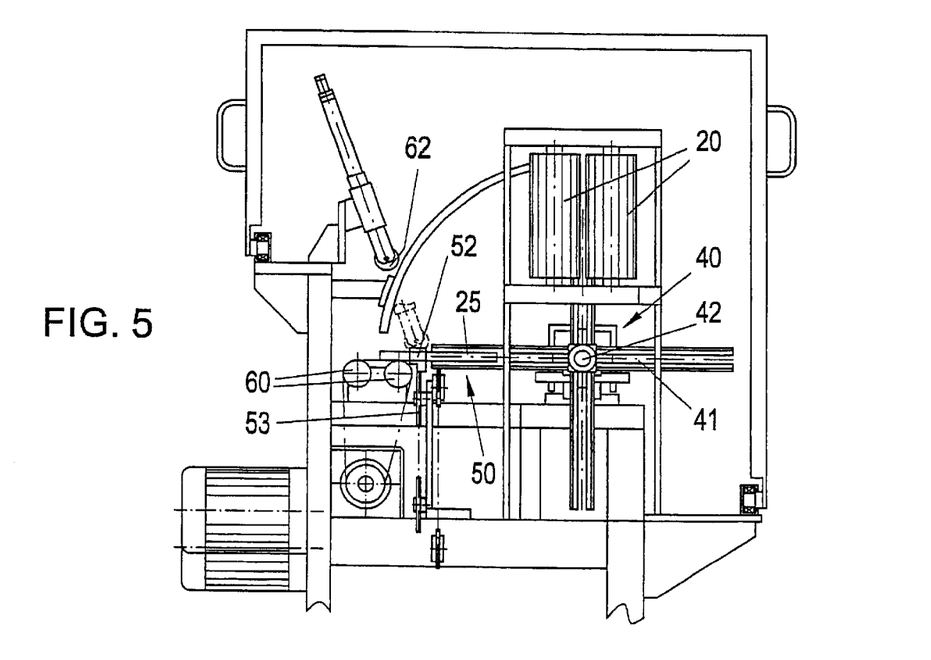

As soon as a sleeve 25 into which a plate is to be inserted has been received in a compartment 41, the transfer device 40 is turned by a drive which is not detailed by 90° until the compartment 41 in which the sleeve 25 is held is aligned horizontally and is assigned to the device 50 for inserting the plate 51, therefore assumes the horizontal position shown in FIG. 5 for the left compartment 41.

Figure 4:
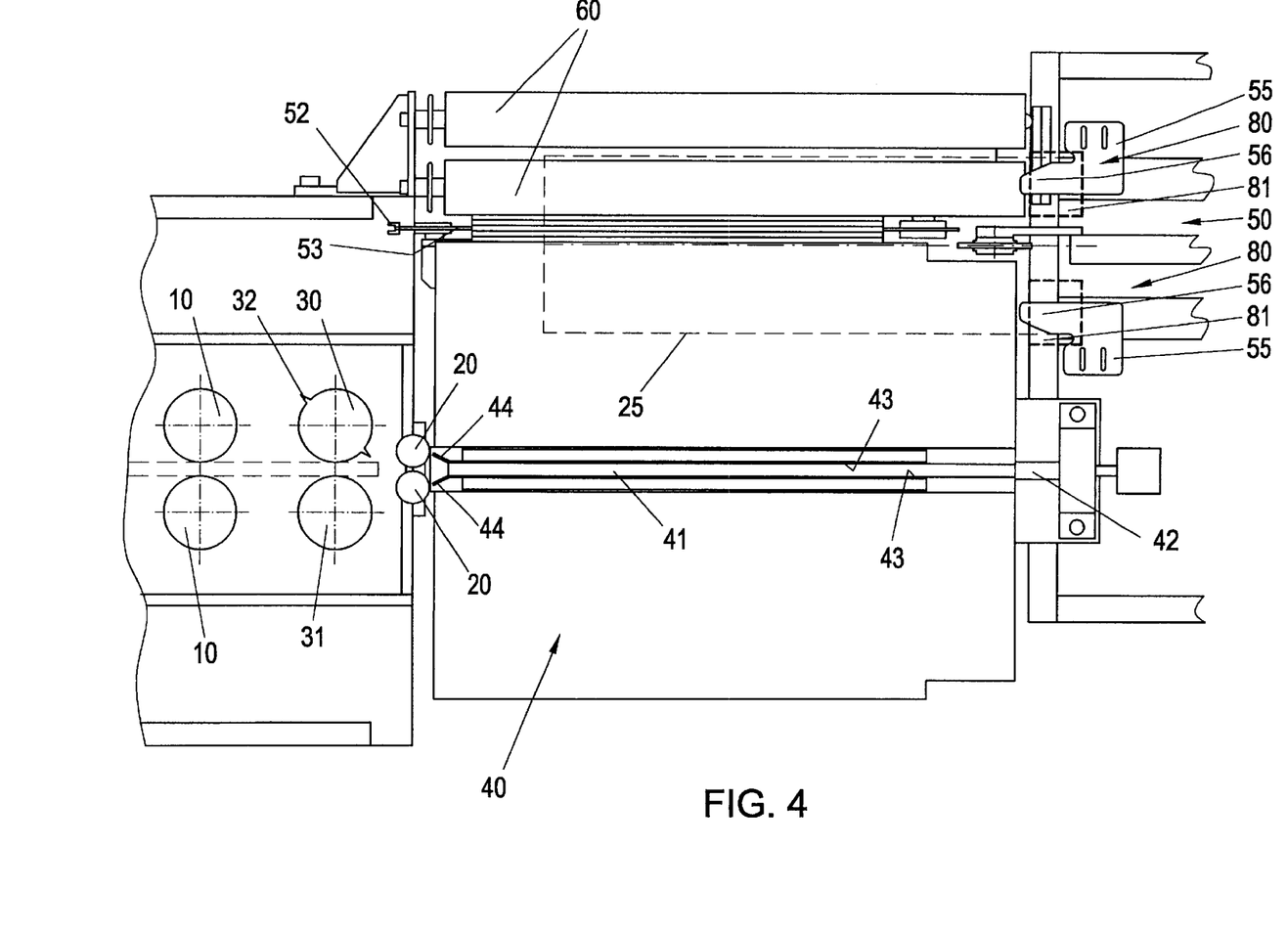

In this position on the side of the sleeve 25 which is the left one in FIG. 4 a stop 52 is positioned and moved to the right in FIG. 4 in order to push the sleeve 25 (to the right in FIG. 2 or 4) until the sleeve 25 with its end which lies to the right in FIG. 4 is pushed over the spreading elements 55. Thus the position of the sleeve 25 in the device is accurately defined and the insertion side of the sleeve 25 which lies to the right in FIG. 4 is held open by the spreading elements 55 (see FIG. 4a)

Figure 4A:
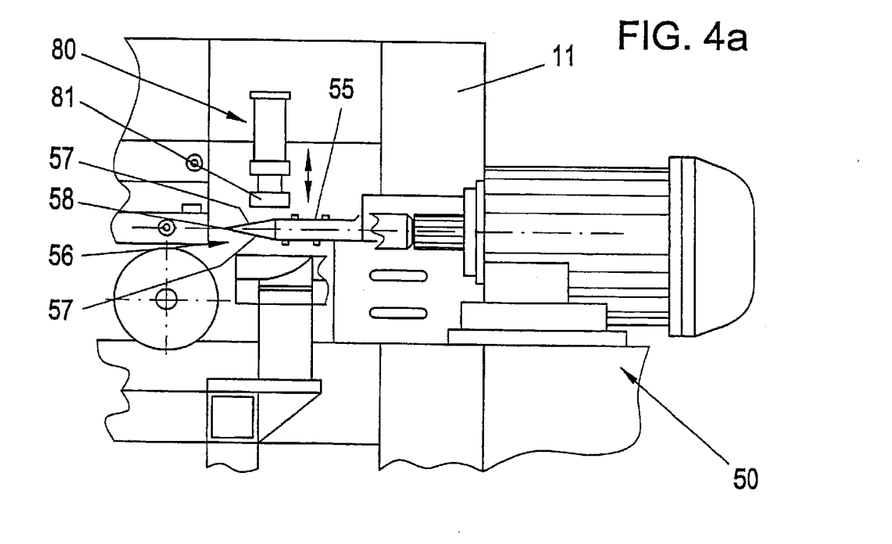

The spreading elements 55 have, as shown in FIG. 4 and FIG. 4a, a shape which is essentially an L-shape in a plan view (FIG. 4) with a leg 56 which points toward the sleeve 25 and which is to be inserted into it. The leg 56 is formed by two spring plates 57 which (FIG. 4a) converge toward the free end to one another so that a pointed front end 58 of the legs 56 results.

It has proven advantageous to hold the sleeve 25 secure at least when the plate 51 is being inserted in the area of the spreading elements 55. To do this, in one embodiment clamping units 80 with clamping plungers 81 are assigned to the spreading elements (compare FIG. 4a), which plungers, for example by hydraulic drives, can be placed from overhead against the end of the sleeve 25 which has been pushed over the legs 56 of the spreading elements 55 in order to fix the sleeve temporarily on the spreading elements 55.

Figure 1:
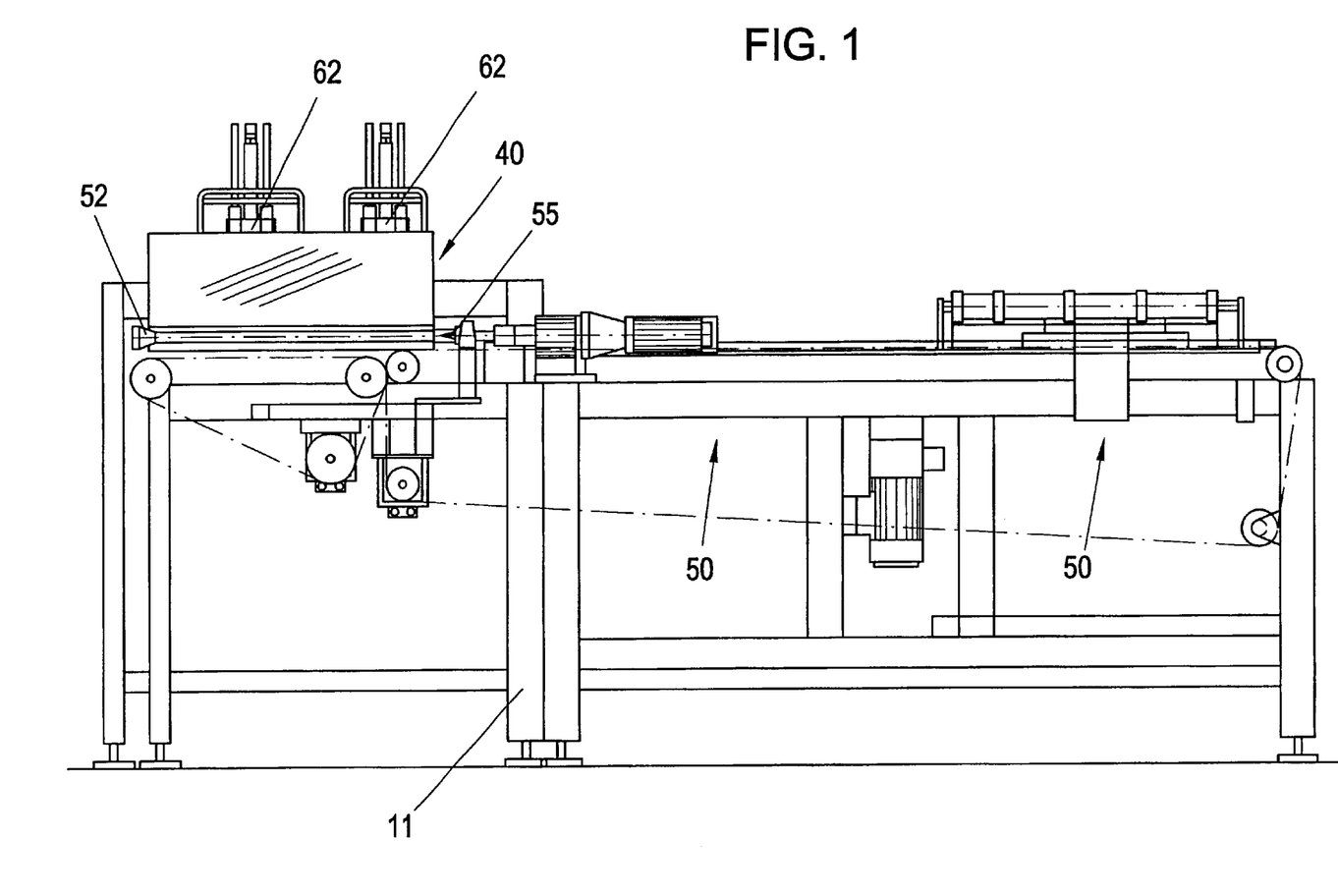
FIG. 1 shows one embodiment of a device as claimed in the invention in a side view.
Figure 2:
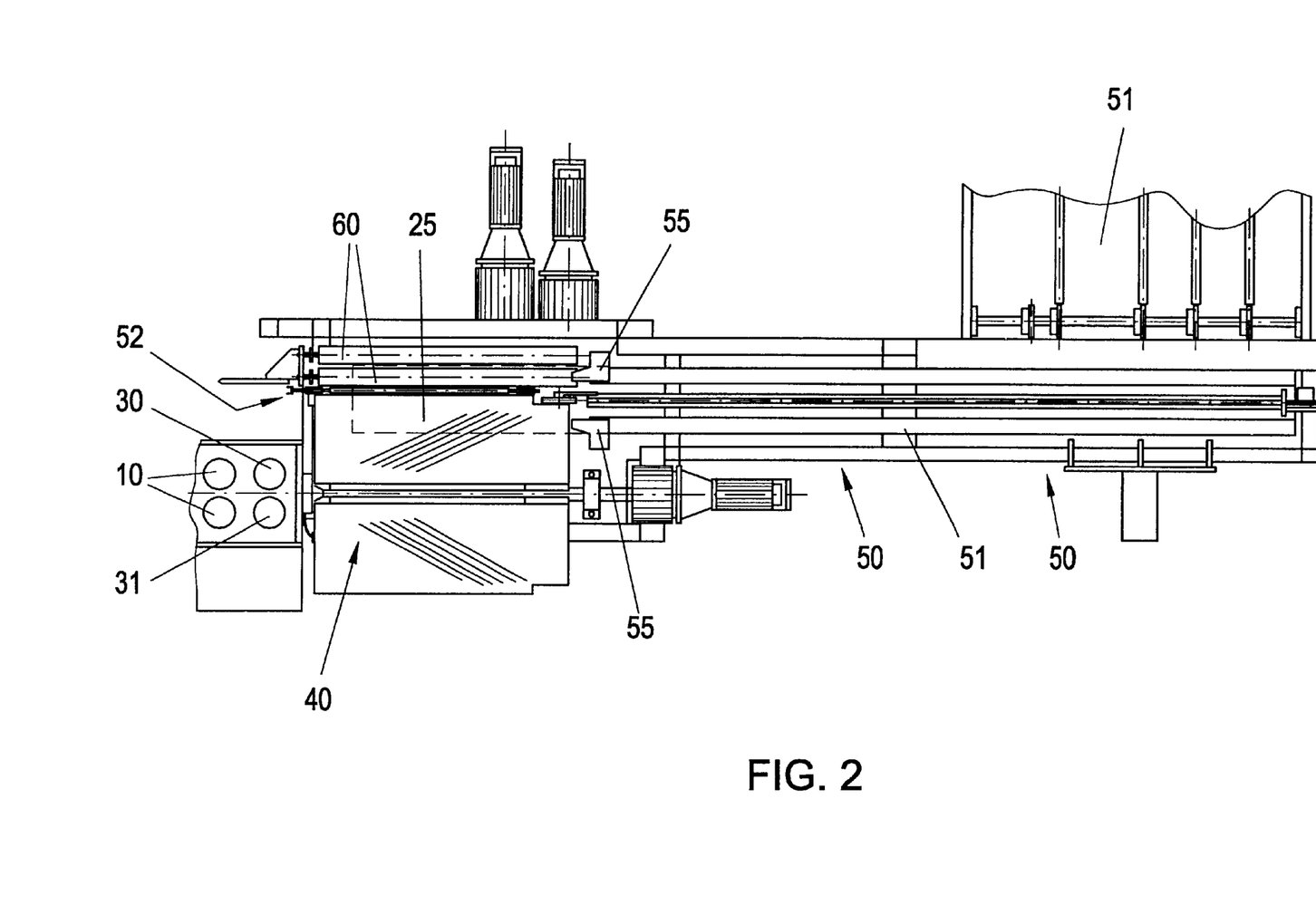
FIG. 2 shows the device from FIG. 1 in a plan view, FIG. 2a a detail of the device from FIGS. 1 and 2 in the area of the compartmented star in a plan view.
Figure 2A:
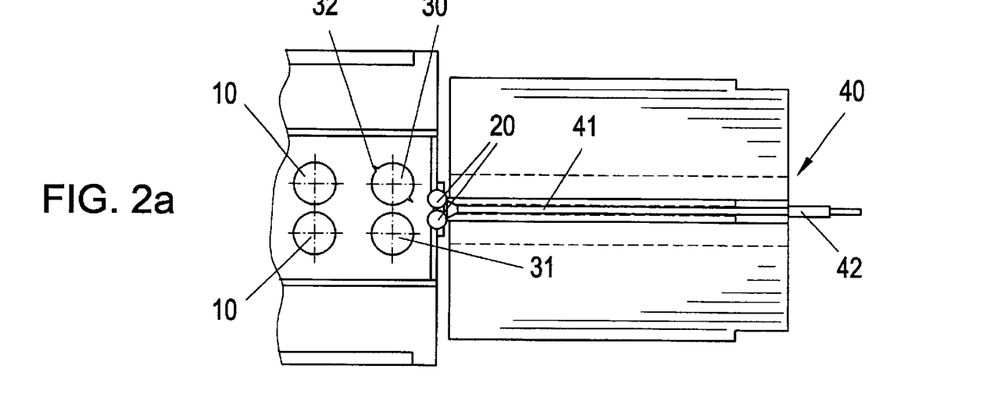
Figure 2B:
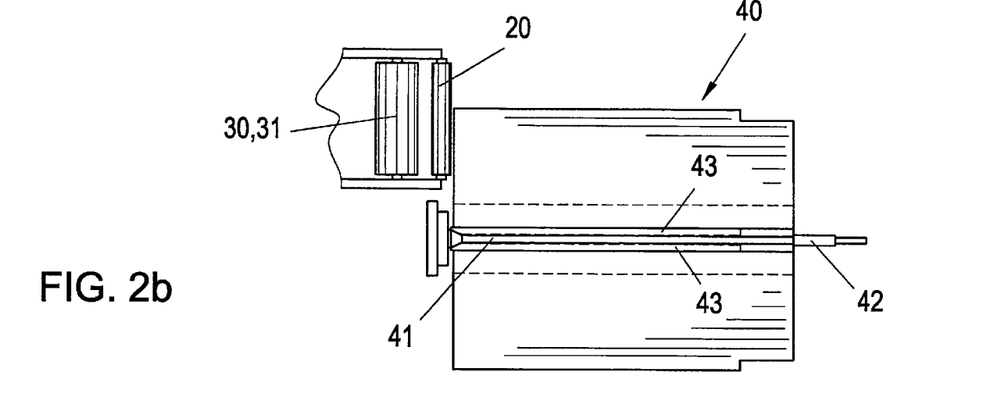
FIG. 2b shows the detail from FIG. 2a in a side view, FIG. 2c the detail viewed from the right of FIG. 2a, FIG. 3 shows on an enlarged scale a detail of the device from FIG. 1 in a side view, FIG. 4 the detail from FIG. 3 in a plan view, FIG. 4a a spreading element in a side view.
Figure 2C:
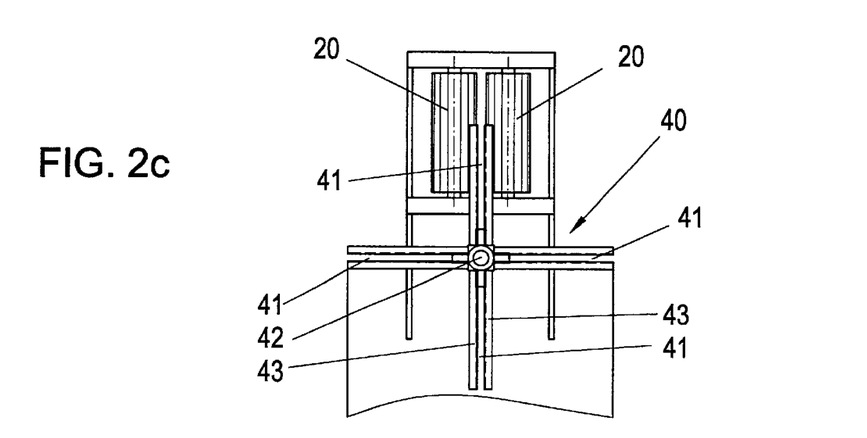

When a plate 51 is advanced by the feed device 50 which lies to the right in FIGS. 1 and 2 and is pushed into the sleeve 25, the plates 57 of the spreading elements 55, which plates form the conically tapering legs 56, are moved elastically away from one another such that a plate 51 can be inserted between them and through them into the sleeve 25 which is held open as far as the front end of the plate 51 which has assumed the position defined by the stop 52.

Figure 4B:
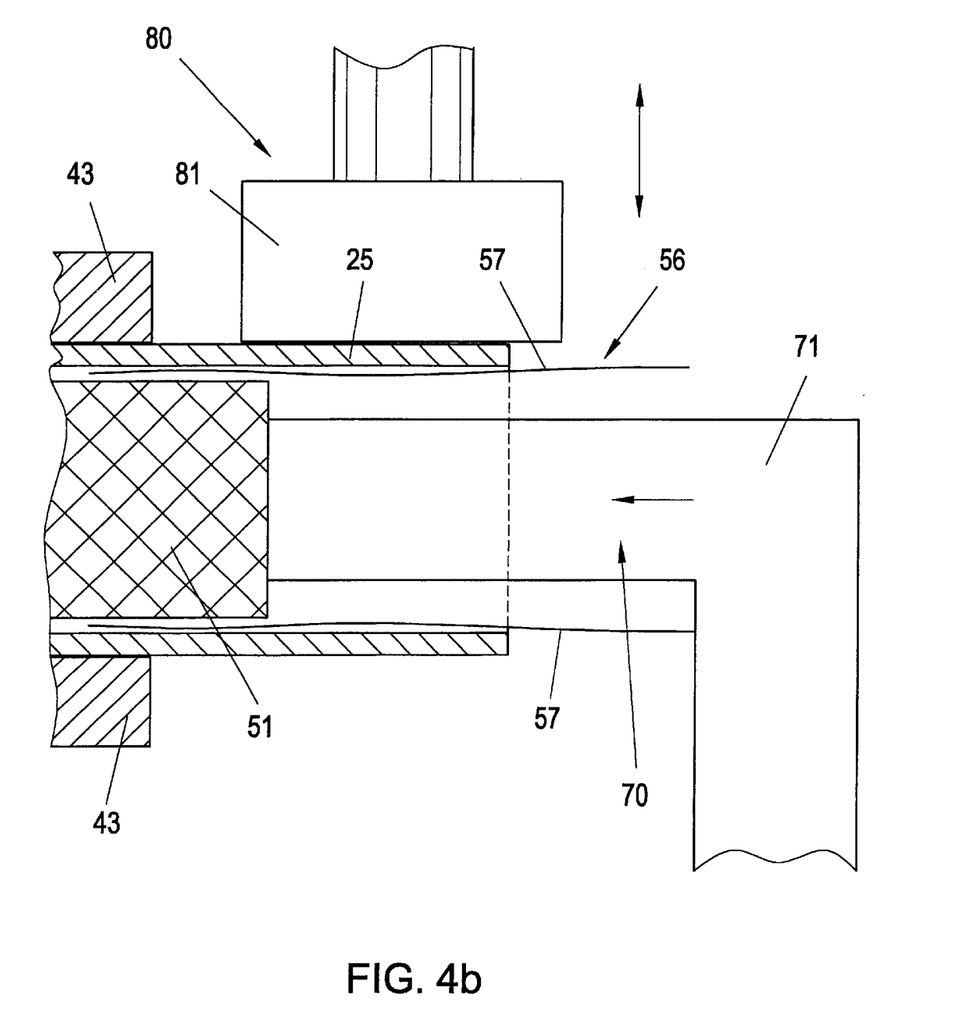
FIG. 4b shows an insertion finger when the plate is inserted into the sleeve and FIG. 5 shows on an enlarged scale a view of the device from FIGS. 1 and 2 viewed from the left of FIGS. 1 and 2 on an enlarged scale.

In one preferred embodiment the insertion device 50 has for example two insertion fingers 70 which are formed angled (compare FIG. 4b) and their horizontal legs 71 engage the end of the plate 51 to be pushed into the sleeve 25, the edge which is the rear edge relative to the insertion direction. This embodiment of the insertion fingers 70 allows the plate 51 to be pushed so far into a sleeve 25 that its rear edge is located within the sleeve 25 (FIG. 4b).

With the described arrangement an exactly defined position of the sleeve 25 in the compartment 41 is reached since the spreading elements 55 are mounted stationary in the machine frame 11 even though their location can be adjustable and/or can be matched to the width of the sleeves 25 and the sleeve 25 is pushed by the stop 52, which engages the edge of the sleeve 25 which lies to the left in FIGS. 1 to 4, in compartment 41 until the end of the sleeve 25 which lies to the right in FIG. 4 has been pushed over the spreading elements 55 or their tapering legs 56. This embodiment is especially advantageous when the end of the sleeve 25 which is the right end in FIG. 4 projects over the compartment 41 laterally towards the spreading elements 55 since then the spreading elements 55 themselves need not be pushed into the compartment 41 on the compartmented star 40.

Figure 3:
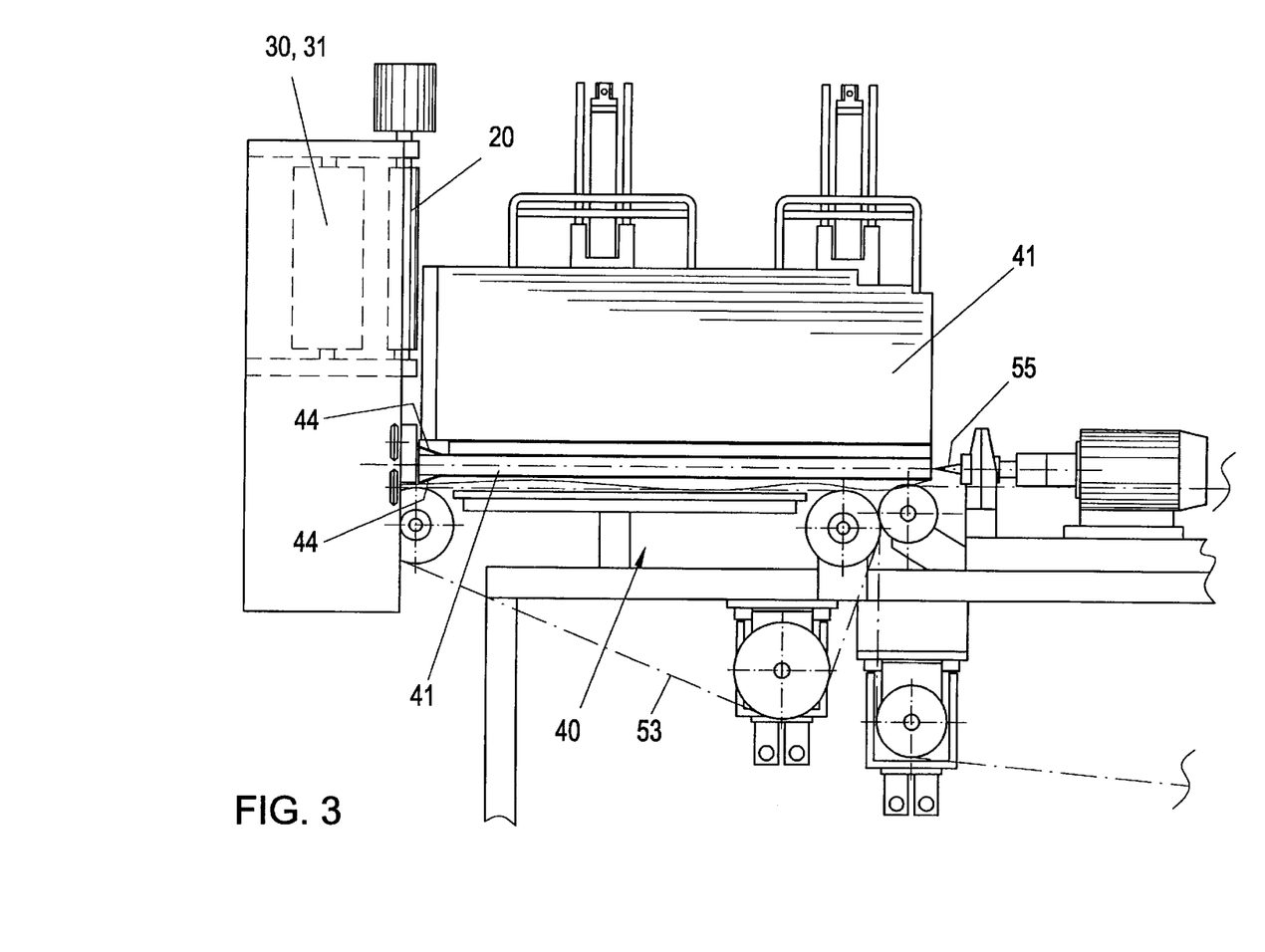

As shown again in FIGS. 3 and 4, on the inlet side into the compartments 41 which are located on the shaft 42 and are formed by the walls 43 there are slanted sheets 44 as guide sheets in order to ensure reliable insertion of the tubular sleeves 25 into the compartments 41.

In this embodiment, on the shaft 42 there are four wall pairs 43 for four compartments 41. It goes without saying that there can also be more or fewer than four compartments 41.

When the insertion of a plate 51 into a sleeve 25 is ended, it is pulled laterally (transversely to the axis of the shaft 42) out of the compartment 41. To do this there are two conveyor rollers 60 which are provided underneath the plane of the sleeve 25 with the plate 51 inserted. From overhead at least one, but preferably two, as in the embodiment, pressure rollers 62 are pressed down onto the sleeve 25 in order to ensure the necessary frictional engagement between the transport rollers 60 and the sleeve 25 for lateral removal. The rollers 60 can have a plastic coating to increase the friction between them and a sleeve 25 and/or can be provided with small grooves which run in the axial direction. If the rollers 60 have grooves, prompt and reliable removal of a sleeve 25 with the plate 51 pushed in is possible since the ribs of the separator material which are present on the sleeve 25 fit into the grooves on the rollers 60.

Especially when the rollers 60 are plastic-coated, and/or have grooves, are the compression rollers 62 at best dispensable.

The stop 52 for adjusting the sleeve 25 and the plate 51 which has been pushed into it is attached for example to a continuous conveyor element 53 so that it (see FIG. 4 and FIG. 5) can be moved through between the edge of the compartment 41 on the one hand, i.e. the edge which is the lateral edge in this position, and the two transport rollers 60 on the other in order to slip the sleeve 25 onto the legs 56 of the spreading elements 55 (see FIG. 4).

It is advantageous that the plate 51 is located in the sleeve 25 in a defined position. For example, in the embodiment of the device as claimed in the invention shown in FIGS. 1 to 5, not only the sleeve 25 itself is moved into a defined position by the stop 52 which is assigned to the end of the sleeve 25 which lies to the left in FIG. 4, by pushing the sleeve onto the legs 56 of the spreading elements 55, but also the plate 51 which is to be pushed into the sleeve 25 can only be pushed until it rests against the stop 52. This results in the plate 51 being located in the sleeve 25 such that the edge of the plate 51 which is the left edge in FIG. 4 is flush with the end of the sleeve 25 which is the left end in FIG. 4. To do this, for insertion of the plate 51 into a sleeve 25 which is held in a compartment 41 in the insertion position and which is held open on one end by the spreading elements 55 there are insertion fingers 70 which are made such that on their parts which engage the plates 51 they are not thicker than the plate 51 itself so that the insertion fingers 70 with their legs 71 dip into the sleeve 25 (compare FIG. 4b) and can advance the plate 51 so far that its edge which is the left edge in FIG. 4 and the forward edge relative to the advance direction is located flush with the edge of the sleeve 25 facing away from the insertion side (in FIG. 4 the left edge of the sleeve 25).

In summary, one preferred embodiment of the device as claimed in the invention can be described as follows:

On the delivery side of a device in which tubular sleeves 25 for battery plates are produced from web-shaped separator material, there is a compartmented star 40 with several compartments 41. After a sleeve 25 has been inserted into the compartment 41, the compartmented star 40 is turned to move the compartment 41 with the sleeve 25 held in it into the insertion position. In the insertion position the sleeve 25 in the compartment 41 is pushed by a stop 52 so far that its insertion-side end is pushed over the legs 56 of the spreading elements 55. Through the end of the sleeve 25 held open by the spreading elements 55 a plate is inserted until it rests against the stop 52. Then the sleeve 25 with the plate pushed into it is pulled out of the compartment 41 laterally by rollers 60 and delivered for further use.

What is claimed is:

1. Device for inserting plates (51) for batteries into sleeves (25) of separator material, characterized in that there is at least one compartment (41) for holding a sleeve (25) which can be moved out of the position in which the sleeve (25) is pushed into the compartment (41), into a position in which the plate (51) in inserted into the sleeve (25) located in the compartment (41), wherein in the position of the compartment (41) in which a plate (51) is inserted into the sleeve (25) there are two spreading fingers (55) to keep open the end of the sleeve (25) through which the plate (51) is inserted.

2. Device as claimed in claim 1, wherein there are two or more compartments (41) on a common roller (42) which is pivotally mounted in the device (11).

3. Device as claimed in claim 1, wherein the compartments (41) are formed by two walls (43) which are parallel to one another and which are attached to the shaft (42).

4. Device as claimed in claim 1, wherein the compartments (41) measured in the direction of the narrow side of the sleeves (25) are narrower than the sleeve (25) which has been folded flat and viewed in the lengthwise direction are longer than the sleeves (25).

5. Device as claimed in claim 1, wherein the device is located following the device for producing tubular sleeves from strip-shaped separator material.

6. Device as claimed in claim 1, wherein between the device and the device for producing tubular sleeves (25) from separator material there is a device for cutting off (30, 31, 32) the sleeves (25).

7. Device as claimed in claim 1, wherein for the compartment (41) in its position in which plate (51) is being inserted there is an optionally adjustable stop (52) for fixing the edge of the sleeve (25) opposite the insertion side and the plate (51) which has been pushed into it.

8. Device as claimed in claim 7, wherein the stop (52) is located next to the lengthwise edge of the compartment (41).

9. Device as claimed in claim 7, wherein the stop (52) has a part which fits into a compartment (41).

10. Device as claimed in claim 1, wherein the spreading fingers (55) are essentially L-shaped and wherein one leg (56) consists of two spring plates (50) which converge in a point towards one another towards their free ends (58).

11. Device as claimed in claim 10, wherein the legs (56) of the spreading elements (55) which converge towards one another in a point fit into the sleeve (25) from the insertion side with the sleeve (25) aligned in the calibration position.

12. Device as claimed in claim 1, wherein next to a compartment (41) located in its feed position there is a device (50) for feeding and advancing of plates (51).

13. Device as claimed in claim 12, wherein the device (50) for feed and advance of plates (51) has at least one feed finger (70/71) which engages the edge of the plate (51) which is the rear edge relative to the feed direction and can be inserted into the opened sleeve (51).

14. Device as claimed in claim 1, wherein next to a compartment (41) located in its insertion position there is at least one conveyor roller (60) for pulling the sleeves (25) with the inserted plates (51) out of the compartment (41).

15. Device as claimed in claim 14, wherein at least one hold-down roller (62) is assigned to at least one transport roller (60).

16. Device as claimed in claim 15, wherein there are hold-down rollers (62) on holding devices which can be moved forward and backward by a motor, with a direction of motion which is tilted obliquely to the plane of the compartment (41).

17. Device as claimed in claim 14, wherein the conveyor rollers (60) have a rippled or grooved jacket surface.

18. Device as claimed in claim 14, wherein the conveyor rollers (60) bear a friction-enhancing jacket, for example, made of plastic.

19. Device as claimed in claim 1, wherein in the area of the spreading fingers (55) there is at least one plunger (80/81) for temporarily holding the sleeve (51) against the spreading fingers (55).

20. Device for inserting plates (51) for batteries, into sleeves (25) of separator material, characterized in that there is at least one compartment (41) for holding a sleeve (25) which can be moved out of the position in which the sleeve (25) is pushed into the compartment (41), into a position in which the plate (51) in inserted into the sleeve (25) located in the compartment (41), wherein on the side from which the sleeves (25) are inserted into a compartment (41) the walls are provided with guide sheets (44) which diverge obliquely.

21. Device for inserting plates (51) for batteries, into sleeves (25) of separator material, characterized in that there is at least one compartment (41) for holding a sleeve (25) which can be moved out of the position in which the sleeve (25) is pushed into the compartment (41), into a position in which the plate (51) in inserted into the sleeve (25) located in the compartment (41), wherein on the insertion side of the compartment (41) in its position in which the sleeve (25) is inserted there is at least one pair of transport rollers (20) or transport rolls.

* * * * *